United States Patent
Okuwaki

(10) Patent No.: US 6,805,456 B2
(45) Date of Patent: Oct. 19, 2004

(54) PLANAR LIGHT SOURCE UNIT

(75) Inventor: Daisaku Okuwaki, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/237,084

(22) Filed: Sep. 9, 2002

(65) Prior Publication Data

US 2003/0048630 A1 Mar. 13, 2003

(30) Foreign Application Priority Data

Sep. 12, 2001 (JP) ........................................ 2001-277311

(51) Int. Cl.[7] .................................................. F21J 8/00
(52) U.S. Cl. ........................... 362/31; 362/26; 362/551; 362/558; 362/327
(58) Field of Search .............................. 349/62; 362/31, 362/26, 558, 551, 327

(56) References Cited

U.S. PATENT DOCUMENTS 6,485,157 B2 * 11/2002 Ohkawa ........................ 362/31
6,648,485 B1 * 11/2003 Colgan et al. ................. 362/31
6,671,013 B1 * 12/2003 Ohkawa ........................ 349/62

* cited by examiner

*Primary Examiner*—Stephen Husar
*Assistant Examiner*—Anabel Ton
(74) *Attorney, Agent, or Firm*—Dennison, Schultz, Dougherty & MacDonald

(57) ABSTRACT

A planar light source unit has a transparent light leading plate and a light source provided opposite to the incidence surface of the lead plate. The light leading plate has a light discharge surface at an upper surface, and a lower plane. A prism is provided in the light leading plate at a position opposite to the light source.

4 Claims, 3 Drawing Sheets

PLANAR LIGHT SOURCE UNIT

BACKGROUND OF THE INVENTION

The present invention relates to a planar light source unit for emitting a linear light beam, which unit is used in a display having a backlight device, front light device, or a light guide.

In recent years, the liquid crystal display device having the backlight device is used in the notebook personal computer, desktop personal computer, and others.

FIG. 2 is a sectional side view showing a conventional planar light source unit. In the drawing, the planar light source unit comprises a transparent light leading plate 1 made of a material capable of effectively transmitting light, such as acrylic resin, and formed into a rectangular parallelepiped, and an LED package 3 having a LED 2 which is suitable for rendering the light source compact. The light leading member 1 has a light discharge surface 1a. On a lower plane 1b, a plurality of small prisms 4 are formed, so that light is reflected from the prisms 4 to the light discharge surface 1a. The prisms 4 are formed when molding the light leading plate 1.

On the underside of the plate 1, a reflection plate (not shown) made of a white sheet is attached so as to reflect the light passing through the light leading plate 1.

The light from the LED 2 enters the light leading plate 1. The light is reflected at the upper light discharge surface 1a and at the lower plane 1b where there are no prisms, as the light is transmitted further into the light leading plate 1 without loss. The light is further reflected upward at the grooves 4 and discharged from the light discharge surface 1a. The light passing through the lower plane 1b is reflected by the reflection plate so as to be discharged through the light discharge surface 1a. Thus a liquid crystal display panel (not shown) provided above light leading plate 1 is irradiated from the back of the panel.

In FIG. 2, the solid lines show the optical paths of light beams entering the light leading plate 1, reflected at the prisms 4, and discharged out of the plate 1. The dotted lines show a range in which the light beams cannot be utilized.

The conventional light leading plate 1 has the following problem. FIG. 3 is a graph showing the directivity of an LED. The graph indicates that the luminance is the highest in the area opposite the light source and decreases at both sides thereof, thereby forming an oval curvature. Namely, although the light beams in the range between the dotted lines in FIG. 2 have the largest luminance, they cannot be used. Hence the exiting luminance of the light leading plate cannot be increased, thereby increasing the power consumption of the LED.

SUMMARY OF THE INVENTION

An object of the present invention is to provide a planar light source unit having a light leading plate where the light beams from a light source can be effectively transmitted through a light leading plate, and which can uniformly irradiate a light discharge surface of the light leading plate, thereby increasing the luminance of the light beams and decreasing the power consumption.

According to the present invention there is provided a planar light source unit comprising a transparent light leading plate, the light leading plate having a light discharge surface at an upper surface, and a lower plane, an incidence surface formed at a side of the light leading plate, a light source provided opposite to the incidence surface, a first prism provided in the light leading plate at a position opposite to the light source.

The planar light source unit further comprising a plurality of second prisms provided on the lower plane of the light leading plate.

The first prism has an isosceles triangular sectional shape, and an apex of the isosceles triangle is directed to the light source.

One of two equal sides of the isosceles triangle is faced to the light discharge surface and the other is faced to the lower plane.

DETAILED DESCRIPTION OF THE PREFERRED EMBODIMENT

Figure 1:
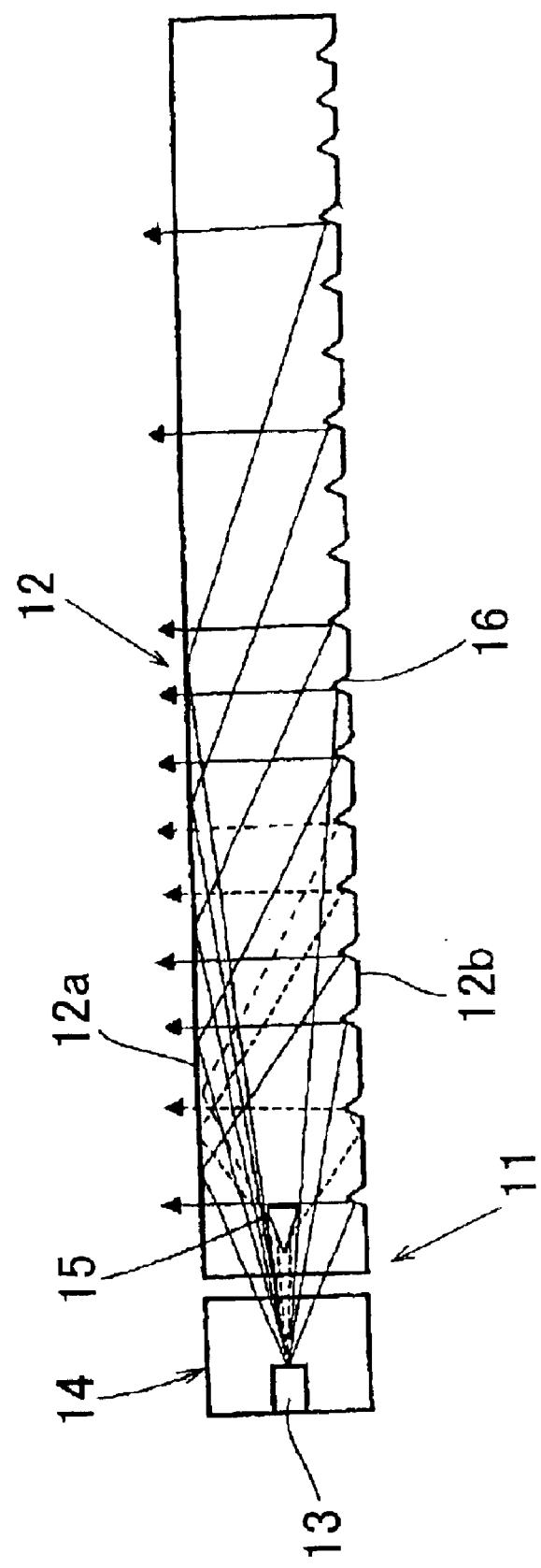
FIG. 1 is a sectional view showing a planar light source unit according to the present invention.
Figure 2:
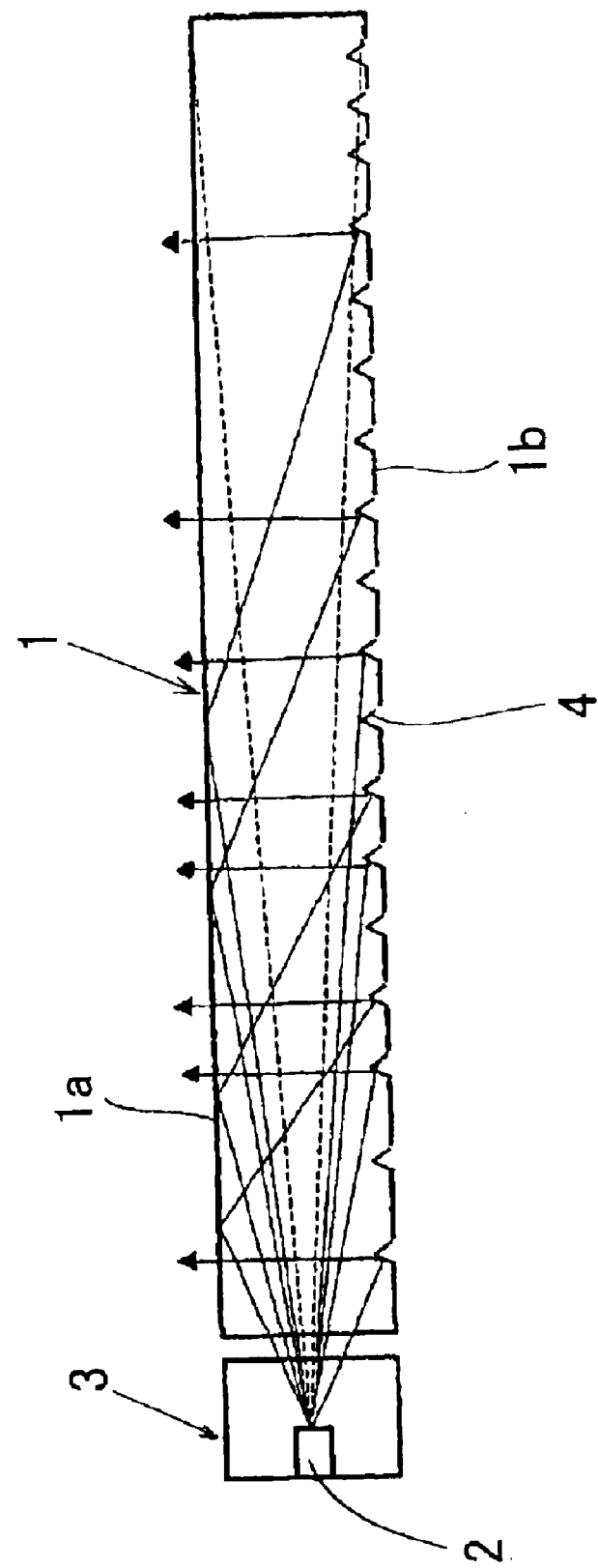
FIG. 2 is a sectional side view of the conventional planar light source unit.
Figure 3:
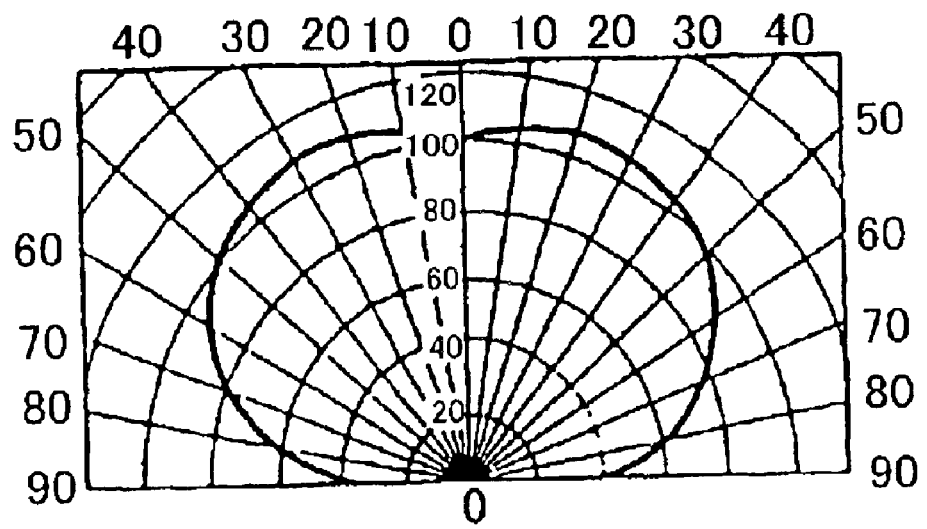
FIG. 3 is a graph showing the directivity of an LED.

Referring to FIG. 1, a planar light source unit 11 comprises a transparent light leading plate 12 made of a material capable of effectively transmitting light, such as acrylic resin and formed into a rectangular parallelepiped, and an LED package 14 having an LED 13 as a light source, disposed at an incidence surface of the light leading plate 12. The light leading plate 12 has a light discharge surface 12a at an upper surface, and a lower plane 12b.

The light leading plate 12 has a central first prism 15 formed by a hole at a position opposite to the LED 13. The prism 15 has an isosceles triangular shape, and the apex of the isosceles triangle is directed to the LED 13. One of two equal sides of the triangle is faced to the light discharge surface 12a and the other is faced to the lower plane 12b.

The lower plane 12b has a plurality of second prisms 16 formed by grooves as is in the conventional unit. The prism 15 and 16 are formed when molding the light leading plate 12.

On the underside of the lower plane 12b, a white reflection sheet (not shown) is attached so as to reflect the light passing through the lower plane 12b.

The light from the LED 13 enters the light leading plate 12. As shown by the solid lines, the light is reflected at the upper light discharge surface 12a and at the lower plane 12b where there are no prisms, as the light is transmitted further into the light leading plate 1 without loss. The light is further reflected upward at the prisms 16 and discharged from the light discharge surface 12a. The light passing through the lower plane 12b is reflected by the reflection sheet so as to be discharged through the light discharge surface 12a. Thus a liquid crystal display panel (not shown) provided above the light leading plate 12 is irradiated from the back of the panel.

In the region shown by the dotted lines, the light beams entering the light leading plate 12 from the surface opposite the LED 13, which have the highest luminance, are divided into the upper beams and lower beams by the triangular prism 15 so that the beams reach the light discharge surface 12a or the lower plane 12b. Thus the light emitted from the LED 13 is effectively utilized.

By providing the prism 15 in the light leading plate 12, due to the synergic effect of the light beams in the regions within the solid lines and within the dotted lines, the efficiency of the light is increased. If the luminance need only to be at the level of the conventional light leading plate, the power consumption of the LED 13 is decreased.

The light source need not be limited to the LED and other light sources such as a fluorescent light may be used.

From the foregoing, it will be understood that the present invention provides a light leading plate which enables to produce a light source unit where the efficiency of the emitted light is increased.

While the invention has been described in conjunction with preferred specific embodiment thereof, it will be understood that this description is intended to illustrate and not limit the scope of the invention, which is defined by the following claims.

What is claimed is:

1. A planar light source unit comprising:

a transparent light leading plate;

the light leading plate having a light discharge surface at an upper surface, and a lower plane;

an incidence surface formed at a side of the light leading plate;

a light source provided opposite to the incidence surface; and a first prism provided in the light leading plate at a position opposite to the light source;

the first prism having an isosceles triangular sectional shape, with an apex of the isosceles triangle being directed to the light source.

2. The planar light source unit according to claim 1 further comprising a plurality of second prisms provided on the lower plane of the light leading plate.

3. The planar light source unit according to claim 1 wherein one of two equal sides of the isosceles triangle is faced to the light discharge surface and the other is faced to the lower plane.

4. The planar light source unit according to claim 3 further comprising a plurality of second prisms provided on the lower plane of the light leading plate.

* * * * *